June 19, 1956 R. D. TORREY 2,751,509

SNEAK PULSE SUPPRESSOR

Filed April 7, 1955

INVENTOR.
ROBERT D. TORREY
BY
Charles C. Englisch
AGENT

United States Patent Office 2,751,509

Patented June 19, 1956

2,751,509

SNEAK PULSE SUPPRESSOR

Robert D. Torrey, Philadelphia, Pa., assignor, by mesne assignments, to Sperry Rand Corporation, New York, N. Y., a corporation of Delaware Application April 7, 1955, Serial No. 499,858

18 Claims. (Cl. 307—88)

The present invention relates to amplifier circuits, and is more particularly concerned with an improved magnetic amplifier circuit which includes means for selectively suppressing undesired output signals.

Magnetic amplifiers have, in the past, been utilized in a number of circuit configurations. In general these configurations have employed a core of magnetic material carrying one or more coils thereon; and one of the said coils may in turn be coupled to a source of positive and negative going power pulses. In the operation of such a pulse type amplifier, the power pulses serve to move the core of the magnetic amplifier between predetermined operating points on its hysteresis loop; and input pulses are further coupled to the said amplifier to preselect an operating point on the said hysteresis loop from which the power pulse is operative. Magnetic amplifiers of this type sometimes assume a configuration known as a series type amplifier, wherein the load is in series with a coil to which the said power pulses are coupled, and input pulses may then selectively condition the said core so that the power pulses are presented with either a low or a high impedance, thereby to selectively determine the amount of energy passing to the said load. Such amplifiers may also assume a configuration known as a parallel type amplifier, wherein the load is disposed in parallel with a coil to which the power pulses are applied, or wherein the load is connected to a further coil which is in turn inductively coupled to the said coil to which power pulses are applied.

Amplifiers of these types may further take the form of complementing amplifiers wherein desired output signals are obtained in the absence of an input to the said amplifier; or they may take the form of non-complementing amplifiers wherein no output pulse is obtained until an input pulse is in fact coupled to the amplifier. In either case, however, and whether the amplifier be of the series or of the parallel type, the desired operation of the amplifier is such that a given output, such as a pulse, is achieved in response to the coupling of an input pulse to the amplifier, and an opposite output, such as a "no-pulse" condition is achieved in the absence of an input pulse.

In the case of non-complementing amplifiers of both the series and parallel types, a lack of pulse inputs to the said amplifier should result in there being no pulses at the output of the said amplifier. In practice, however, the operation of magnetic amplifiers has been such that even in the absence of such input pulses (or even in the presence of an input pulse, in the case of a complementer), a small output may be effected by the amplifier and this output, which is ordinarily undesirable, is termed a "sneak output." In order to prevent spurious operation in systems employing such magnetic amplifiers, therefore, it is ordinarily desirable to suppress such sneak outputs; and the present invention is primarily concerned with such a sneak pulse suppressor circuit.

It is accordingly an object of the present invention to provide an improved magnetic amplifier circuit.

Another object of the present invention resides in the provision of improved magnetic amplifier circuits having a sneak pulse suppressor.

Still another object of the present invention resides in the provision of a novel sneak pulse suppressor which does not distort desired output pulses.

A further object of the present invention resides in the provision of an amplifier circuit having a novel magnetic sneak pulse suppressor.

A still further object of the present invention is the provision of a sneak pulse suppressor comprising a variable impedance and means for selectively predetermining the magnitude of the said variable impedance in response to various signal conditions.

Another object of the present invention resides in the provision of an amplifier circuit including sneak pulse suppression means which is more rugged in configuration and less subject to operating failures than has been the case heretofore.

In accomplishing the foregoing objects and advantages, the present invention utilizes a sneak pulse suppressor preferably comprising a core of magnetic material having one or more coils thereon. The said core of magnetic material is caused to move between preselected operating points on its hysteresis loop in response to sneak pulses, or other undesired signals appearing at the output of an amplifier, whereby these undesired signals are absorbed. The sneak pulse suppressor also includes means for inhibiting the described movement, between preselected operating points on its hysteresis loop, in response to the coupling of an input signal to the amplifier in question, whereby desired signals are not absorbed and may pass to utilization means.

In the subsequent discussion, the sneak pulse suppressor utilizing the magnetic core described, is serially interposed between an amplifier output and the said utilization means; and in operation, the suppressor acts as a variable impedance having a relatively high impedance to sneak pulses or to other undesired signals, and exhibiting a relatively low impedance to desired signal outputs occurring in response to a signal input to the said amplifier. It must be understood, of course, that the principles to be discussed may be achieved by arranging a sneak pulse suppressor of the type to be described in parallel with an amplifier output; and in such a case the various controlling pulses coupled to the sneak suppressor may be so modified that the sneak suppressor exhibits a relatively low impedance to sneak pulses, thereby shunting such sneak pulses or other undesired output signals away from a utilization device; and exhibits a relatively high impedance when a desired output signal is effected, whereby the said desired signal may pass to utilization circuitry. In addition, while the subsequent discussion relates to parallel type amplifiers, it will be appreciated that the concepts find equal applicability in series type amplifiers.

The foregoing objects, advantages, construction and operation of the present invention will be more readily seen from the following description and accompanying drawings, in which.

Figures 1, 2:
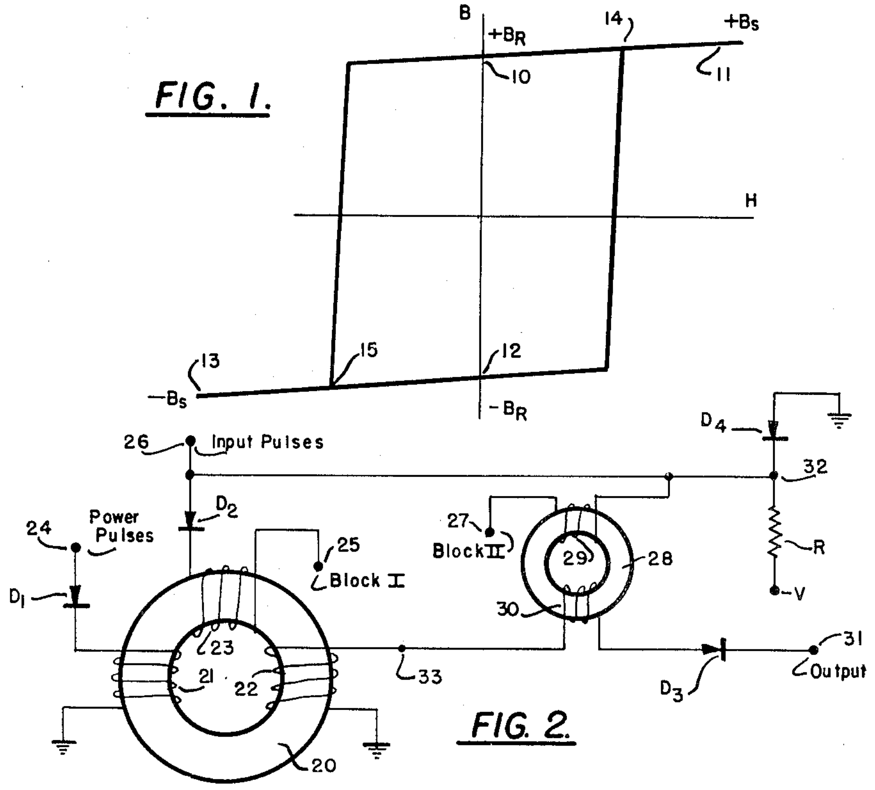
Figure 1 is an idealized hysteresis loop of a magnetic material which may be employed in the cores of magnetic amplifiers, as well as in sneak suppressing circuits, in accordance with the present invention.
Figure 2 is a schematic diagram of a simple parallel type magnetic amplifier employing a sneak suppressor, in accordance with the present invention.

Referring now to the hysteresis loop shown in Figure 1, it will be seen that magnetic cores utilized in the magnetic amplifiers and/or in the sneak suppressor of the present invention, may preferably, but not necessarily, utilize materials exhibiting a substantially rectangular hysteresis loop. Such cores may be made of a variety of such materials, among which are the various types of ferrites, and the various kinds of magnetic tapes, including Orthonik and 4–79 Moly-Permalloy. These materials may in turn be given different heat treatments to effect different desired properties. In addition to the wide variety of materials applicable, the magnetic cores to be discussed may be constructed in a number of different geometries including both closed and open paths. For example, cup-shaped cores, strips of material, or torodial cores may be utilized. It must be emphasized, however, that the present invention is not limited to any specific geometries of its cores nor to any specific hysteretic configuration therefor, and the examples to be given are illustrative only.

Returning now to the hysteresis loop shown in Figure 1, it will be noted that the curve exhibits several significant points of operation, namely, point 10 (+B*r*) which represents a point of plus remanence; the point 11 (+B*s*) which represents plus saturation; the point 12 (−B*r*) which represents minus remanence; the point 13 (−B*s*) which represents minus saturation; the point 14 which represents the beginning of the plus saturation region; and the point 15 which represents the beginning of the minus saturation region.

Discussing for the moment the operation of a device utilizing a core which exhibits a hysteresis loop such as has been shown in Figure 1, let us initially assume that a coil is wound on the said core. If the core should now initially be at its operating point 10 (plus remanance) and if the core should then be caused to move from the said operating point 10 to its operating point 11 (plus saturation), a relatively small flux change will be effected through the coil and core. If, on the other hand, the core should initially be at its minus remanence operating point 12, and the core is then caused to move from its said operating point 12 to the region of plus saturation, preferably to the operating point 14, a relatively large flux change will be effected through the said coil and core.

In a series type magnetic amplifier circuit these considerations may be utilized by coupling a source of energy pulses to one end of the said coil and a load impedance to the other end of said coil. In such a configuration the relatively small flux change effected by operation between the operating points 10 and 11 results in the said coil exhibiting a relatively low impedance whereby substantially all the energy coupled to the said coil may pass readily therethrough to the said load impedance. On the other hand, in such series type circuits the relatively large flux change effected by operation between the operating points 12 and 14 results in the said coil exhibiting a relatively high impedance whereby substantially all the energy coupled to the said coil is absorbed and relatively little, if any, energy is passed to the said load impedance.

In parallel type amplifiers these same considerations are utilized by placing the load impedance in parallel with the said coil whereby an output is coupled to the said load impedance when the coil exhibits a relatively high impedance and the said output is shunted from the said load impedance when the coil exhibits a relatively low impedance. Parallel type amplifiers may further utilize these considerations by including a further coil on the said core, to which further coil the load is coupled, whereby the relatively large flux change occurring when the core operates between its points 12 and 14 induces a relatively large potential by transformer action in the said further coil, giving a desired output; and the relatively small flux change occurring when the core operates between points 10 and 11 induces only a small potential in the said further coil.

The foregoing considerations may also be employed by providing a sneak suppressor circuit utilizing a magnetic core, and by causing the said sneak suppressor to assume predetermined values of impedance in response to predetermined variations in signal input conditions, whereby desired output signals are permitted to pass to utilization circuits while undesired output signals are prevented from so passing. In the particular example shown in Figure 2, both the series and parallel type operations described above have been illustrated; and in this respect the magnetic amplifier shown has been assumed to be a parallel type amplifier, while the sneak suppressor has been assumed to operate upon the series type principles discussed above. Variations are, of course, possible and the sneak suppressor may in fact operate upon parallel type principles and/or the amplifier itself may operate upon series type principles.

Figure 3:
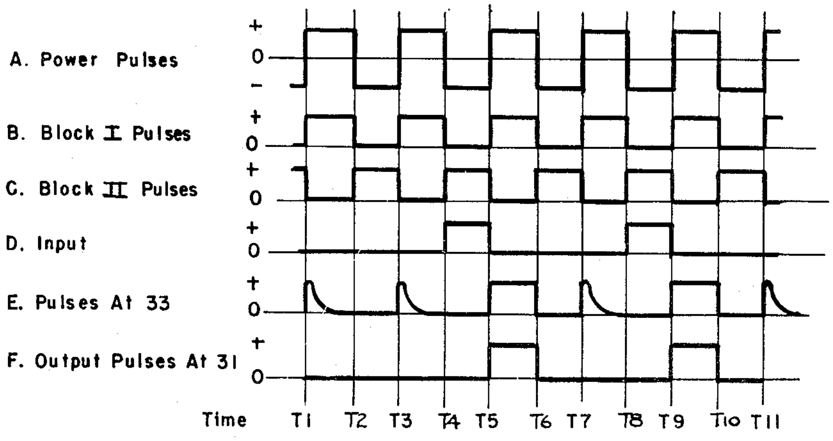
Figure 3 (A through F) are waveform diagrams depicting the operation of the circuit shown in Figure 2.

Referring now to Figure 2, and making reference to the waveforms of Figure 3, it will be seen that a simple parallel type amplifier, in accordance with the present invention, may comprise a magnetic core 20, preferably but not necessarily exhibiting a hysteresis loop of the type discussed in reference to Figure 1. The core 20 carries a power or energization winding 21 thereon and one end of the said winding 21 is coupled via rectifier D1 to a source 24 of regularly occurring power pulses of the configuration shown in Figure 3A. The amplifier further carries an output winding 22 thereon, as well as a signal or input winding 23. The signal winding 23 is also coupled at one of its ends via a rectifier D2 to a source 26 of selectively applied input pulses (Figure 3D); and the other end of the said signal winding 23 is coupled to a terminal 25 to which is applied a source of regularly occurring blocking pulses (Figure 3B).

Disregarding for the moment the operation of the sneak suppressor shown in the remainder of the circuit, and examining the waveforms of Figures 3A, 3B, 3D and 3E, the operation of a simple pulse-type parallel magnetic amplifier will become readily apparent. If we should initially assume that the core 20 is at its plus remanence operating point 10, the application of a positive going power pulse, from the source 24, during the time interal $t1$ to $t2$, will effect a current flow through the rectifier D1 and the winding 21 to ground, whereby the core 20 will tend to be driven from its operating point 10 to the region of plus saturation 11. During this state of operation, a relatively small flux change occurs in the core 20, and this small flux change induces a potential in the output winding 22 which will appear at the point 33, for instance, as a sneak pulse (Figure 3E). This relatively small flux change in the core 20 further induces a potential in the signal or input winding 23, but current is prevented from flowing in this winding inasmuch as the blocking pulse applied at terminal 25, during the time interval $t1$ to $t2$, is positive going in nature, cutting off the rectifier D2. During a time interval $t2$ to $t3$, the core 20 is returned to its plus remanence operating point 10, preparatory to the next positive going power pulse applied, during the time interval $t3$ to $t4$ for instance, and this further positive going power pulse again effects only a sneak output at the point 33 during this time interval $t3$ to $t4$.

If we should now assume that an input pulse is coupled from the terminal 26, during the time interval $t4$ to $t5$ (Figure 3D), this input pulse will, during the said time interval $t4$ to $t5$, effect a current flow through the rectifier D2 and winding 23 to the point 25, which is now at ground potential, and will subject the core 20 to a −H magnetizing force, driving the said core from its plus remanence operating point 10 to its minus remanence operating point 12, preferably via the point 15, during the time interval $t4$ to $t5$. The next positive going power pulse applied from source 24, during the time interval $t5$ to $t6$, will therefore find the core 20 at the said minus remanence operating point 12 and will drive the core to its plus remanence operating point 10 via the operating point 14, during the said time interval $t5$ to $t6$. This particular state of operation effects a relatively large flux change through the core 20 whereby a substantial potential is induced in the output winding 22 and a desired output pulse appears at the point 33. Current is again prevented from flowing in the signal winding 23 during the time interval $t5$ to $t6$ by the application of a positive going blocking pulse at the terminal 25 during this time interval. If no further input pulse should be applied during the time interval $t6$ to $t7$ the core 20 will remain at its plus remanence operating point 10 whereby a further positive going power pulse during the time interval $t7$ to $t8$ will, as before, effect a relatively small flux change in the core 20 and will give only a sneak output at the point 33.

Thus, the amplifier utilizing core 20 acts as a non-complementing amplifier, in that a desired output pulse is achieved only in response to an input pulse at terminal 26. As will be apparent from the foregoing discussion, however, even in the absence of such input pulses, sneak pulses appear at the output point 33, for instance during the time intervals $t1$ to $t2$, $t3$ to $t4$, $t7$ to $t8$, etc., and these sneak pulses may in turn produce spurious operation of an overall circuit employing a magnetic amplifier of the type shown.

In accordance with the present invention, such sneak outputs may be suppressed by employing a further magnetic circuit acting as a variable impedance. Thus, such a sneak suppressor may comprise a core 28 of magnetic material, again preferably but not necessarily exhibiting a hysteresis loop of the type shown in Figure 1; and the said core 28 may carry two windings 29 and 30 thereon. The winding 30 is coupled at one of its ends to the output point 33 of the magnetic amplifier, and the other end of the said winding 30 is coupled via rectifier D3 to an ultimate output point 31 which may comprise the input to any desired utilization circuit. The winding 29 is further coupled at one of its ends to a terminal 27, to which terminal is coupled a source of regularly occurring blocking pulses of the type shown in Figure 3C; and the other end of the said winding 29 may be coupled to a point 32 selectively clamped at ground potential by a clamp circuit comprising a rectifier D4 and a resistor R, arranged as shown between points of ground potential and of negative potential $-V$. The said point 32 is also coupled, as shown, to the signal input terminal 26 whereby the presence or absence of input pulses to the amplifier determines the potential of the said point 32 and of the end of winding 29 connected thereto.

Returning now to the waveforms of Figure 3, it will be recalled that during the time intervals $t1$ to $t2$ and $t3$ to $t4$, for instance, the core 20 was caused to operate between its operating points 10 and 11 whereby sneak outputs were obtained. During the same time intervals, however, the core 28 is caused to operate between its operating points 12 and 10, preferably via the operating point 14; and the core 28 is further caused to operate from its operating point 10 to point 12, preferably via the point 15, during the intermediate time interval $t2$ to $t3$.

Thus, during the time interval $t1$ to $t2$, a current flows from ground through the rectifier D4, the resistor R and the source of negative potential $-V$, which maintains the point 32 at substantially ground potential. During this same time interval the point 27 is maintained at substantially ground potential by the blocking pulses applied thereto, whereby current flow is prevented in the winding 29. If we should now assume that the core 28 is at its minus remanence operating point 12 at the time $t1$, a sneak pulse appearing at point 33 during the time interval $t1$ to $t2$ will drive the core 28 from its minus remanence operating point 12 to its plus remanence operating point 10, preferably via the point 14. Inasmuch as the coil 30 exhibits a relatively high impedance for this state of operation, the sneak pulse appearing at point 33 will be absorbed and no output will appear at the ultimate output point 31, via the rectifier D3, during this time interval (Figure 3F). During the next succeeding time interval $t2$ to $t3$, the point 32 remains at ground potential, but the blocking pulse applied to terminal 27 assumes a positive potential whereby a current flows from terminal 27 through the winding 29 to the point 32, subjecting the core 28 to a $-H$ magnetizing force and flipping the said core 28 from its plus remanence operating point 10 to its minus remanence operating point 12, preferably via the point 15. During the time interval $t3$ to $t4$, a further sneak pulse appears at the point 33, once more driving the core 28 from its minus remanence operating point 12 to its plus remanence operating point 10, once more suppressing the said sneak pulse; and in the absence of an input pulse during the time interval $t4$ to $t5$ a reverting current would again flow through the winding 29 to once more condition the core 28 in the manner described.

If, however, an input pulse should in fact be coupled from the terminal 26 to the amplifier, via the rectifier D2, this input pulse will also be coupled, during the time interval $t4$ to $t5$, to the point 32, raising the said point 32 above its clamped ground potential, to substantially the same potential of the blocking pulse applied at terminal 27 during this time interval. With the assumed pulse conditions shown in Figure 3, therefore, no reverting current will flow through the winding 29 during the time interval $t4$ to $t5$ whereby the core 28 remains at its plus remanence operating point 10 at the time $t5$. The output pulse appearing at point 33, during the time interval $t5$ to $t6$, will therefore find the coil 30 to exhibit a relatively low impedance and the core 28 will be driven to saturation from its plus remanence operating point 10, whereby the said desired output pulse will pass readily through the coil 30 and the rectifier D3 to the ultimate output point 31.

If no further input pulse is applied during the time interval $t6$ to $t7$, a reverting current will once more flow, as described previously, through the winding 29, driving the core 28 to its minus remanance operating point 12, whereby the sneak output appearing at point 33 during the time interval $t7$ to $t8$ will once more be absorbed and will not appear at the ultimate output point 31. A still further input pulse from the terminal 26 during the time interval $t8$ to $t9$ will, as before, suppress the reverting current during this time interval, whereby the desired output pulse appearing at point 33 will again be coupled through the rectifier D3 to the point 31.

Thus, the magnetic circuit comprising the core 28, and the windings 29 and 30 thereon, acts as a variable impedance selectively responsive to the presence or absence of input pulses at the terminal 26, whereby undesired outputs from the magnetic amplifier are absorbed and thereby suppressed, and desired outputs from the said amplifier pass readily through the variable impedance to an output point.

It should be noted that the particular circuit shown for the sneak suppressor utilizes a core which is required to absorb only the sneak pulse, and inasmuch as the sneak pulse in practice is small compared to the volt-seconds of the output pulse, the core 28 need have only the required volt-seconds to effect the described suppression, and its setting power can consequently be very low. In addition, it should be noted that when a desired output is in fact obtained, the core 28 and the coil 30 thereon are in a low impedance state whereby the leading edge of the desired output pulse is very little distorted. The rise time of output pulses appearing at the terminal 31 is therefore very good inasmuch as the small size of core 28 presents an inductance of such low value that it has at best a negligible effect on the wave shape of the output pulse. The circuit thus has a pronounced advantage over other methods of sneak pulse suppression, such as limiters, since such other methods ordinarily remove a portion of the desired output pulse. No such removal is effected by the sneak suppressor shown, and desired outputs appear in their substantial entirety at the ultimate output point.

While I have described a preferred embodiment of the present invention, many variations will be readily suggested to those skilled in the art, and certain of these variations have already been mentioned in the preceding description. It should be understood, therefore, that the foregoing description of the present invention is merely illustrative and is not meant to be limitative of my invention.

Having thus described my invention, I claim:

1. An amplifier circuit comprising amplifier means having an input and an output, said amplifier means being selectively responsive to a control signal at said input for producing a further signal at said output, said amplifier also producing a sneak signal at said output in the absence of said control signal at said input, variable impedance means coupled to said amplifier output, said variable impedance means being signal responsive for changing between first and second predetermined magnitudes of impedance, whereby said impedance means changes from one to the other of said magnitudes in response to the presence of said sneak signal at said amplifier output, and means responsive to said control signal for inhibiting a change in magnitude of said variable impedance means.

2. The amplifier circuit of claim 1 wherein said sneak signal causes said impedance means to change from said first to said second magnitude, reverting means coupled to said variable impedance means for changing said impedance means from said second to said first magnitude intermediate the occurrence of successive ones of said sneak signals, and means coupling the said control signal to said reverting means for inhibiting the operation of said reverting means.

3. The amplifier circuit of claim 2 wherein said variable impedance means comprises a selectively saturable magnetic core, a first winding on said core coupled to said amplifier output, said reverting means comprising magnetomotive force producing means coupled to said core.

4. The amplifier circuit of claim 1 wherein said amplifier means comprises a pulse type magnetic amplifier.

5. An amplifier circuit comprising amplifier means having an output, said amplifier means being responsive to input signals for producing desired output signal conditions at said output and producing undesired signal conditions at said output in the absence of said input signals, a magnetic circuit coupled to said amplifier output, magnetomotive force producing means responsive to said undesired output signal conditions for moving said magnetic circuit from a first to a second predetermined point on its hysteresis loop, reverting means for selectively moving said magnetic circuit from said second to said first predetermined point on its hysteresis loop, and means responsive to said input signals for inhibiting the operation of said reverting means.

6. The circuit of claim 5 wherein said magnetic circuit comprises a core of magnetic material, said magnetomotive force means comprising a first winding on said core coupled to said amplifier output, said reverting means comprising a further winding on said core, and means for selectively passing currents through said second winding.

7. The circuit of claim 6 wherein said means for selectively passing currents through said second winding comprises a pulse source coupled to one end of said second winding, potential clamp means coupled to the other end of said second winding, and means coupling said input signals to said clamp means to render said clamp means inoperative when input signals are applied to said amplifier means.

8. The circuit of claim 7 wherein said core comprises a magnetic material exhibiting a substantially rectangular hysteresis loop.

9. An amplifier circuit comprising a magnetic amplifier including a core of magnetic material having first and second windings thereon, a source of selective input pulses coupled to said first winding for controlling potentials induced in said second winding, magnetic variable impedance means coupling said second winding to an output point, and means coupling said source of input pulses to said magnetic variable impedance means whereby said variable impedance means assumes a first magnitude of impedance when said input pulses are coupled to said first winding and assumes a second magnitude of impedance in the absence of said input signals.

10. The amplifier circuit of claim 9 wherein said magnetic variable impedance means comprises a further core of magnetic material, a third winding on said further core having one end connected to said output point and the other end thereof coupled to said second winding, a fourth winding on said further core for selectively applying a magnetomotive force to said further core in opposition to that effected by current flow through said third winding, and means responsive to said input pulses for controlling current flow through said fourth winding.

11. The amplifier circuit of claim 10 wherein each of said cores comprises a magnetic material exhibiting a substantially rectangular hysteresis loop.

12. An amplifier circuit comprising pulse type amplifier means having an input and an output, a source of selective input pulses coupled to said input for selectively effecting corresponding output pulses at said amplifier output, a hysteresis device selectively exhibiting differing magnitudes of impedance coupled to said amplifier output, and means responsive to said source of input pulses for causing said hysteresis device to assume a first magnitude of impedance in response to the presence of said input pulses and causing said hysteresis device to assume a second magnitude of impedance different from said first magnitude in response to the absence of said input pulses.

13. The amplifier circuit of claim 12 wherein said amplifier means comprises a non-complementing magnetic amplifier.

14. The circuit of claim 12 wherein said hysteresis device includes a core of magnetic material exhibiting a substantially rectangular hysteresis loop.

15. An amplifier circuit comprising magnetic amplifier means having an input and an output, said amplifier means being responsive to selectively applied signals at said input for producing desired signals at said output and said amplifier producing undesired signals at said output in the absence of said input signals, a variable impedance hysteresis device coupled to said amplifier output, said hysteresis device exhibiting a relatively high impedance to said undesired signals, and control means responsive to said input signals for selectively causing said hysteresis device to assume a relatively low impedance.

16. The circuit of claim 15 wherein said hysteresis device includes a core of magnetic material having a hysteresis loop, said core being operative over high impedance portions of said hysteresis loop in the absence of said input signals, said control means comprising magnetomotive force means for causing said core to operate over a low impedance portion of its hysteresis loop in response to said input signals.

17. An amplifier circuit comprising a pulse type magnetic amplifier having an input and an output, said amplifier being responsive to selectively applied input pulses at said input for producing output pulses at said output, a variable impedance device coupled to said output for controlling the passage of said output pulses to an output point, said variable impedance device comprising a core of magnetic material having first and second windings thereon, means coupling said first winding to said amplifier output thereby to cause said core to operate over a first predetermined portion of its hysteresis loop in the absence of said input pulses, and control means including a second winding on said core to cause said core to operate over a second predetermined portion of its hysteresis loop when said input pulses are applied to said magnetic amplifier.

18. The circuit of claim 17 in which said variable impedance device is connected in series between said amplifier output and said output point.

No references cited